United States Patent [19]
Romey

[11] 3,854,373
[45] Dec. 17, 1974

[54] EXPANSION ANCHOR

[75] Inventor: Ingo Romey, Essen, Germany

[73] Assignee: Bergwerksverband GmbH, Essen, Germany

[22] Filed: Dec. 12, 1972

[21] Appl. No.: 314,438

[30] Foreign Application Priority Data
Dec. 13, 1971 Germany............................ 2161717

[52] U.S. Cl.................................. 85/82, 260/763
[51] Int. Cl............................................. F16b 13/14
[58] Field of Search .................. 85/82, 63; 260/763

[56] References Cited
UNITED STATES PATENTS
1,455,893   5/1923   Stockton............................ 260/763

| | | | |
|---|---|---|---|
| 1,942,256 | 1/1934 | Rawlings | 85/82 |
| 3,359,229 | 12/1967 | Chaler et al. | 260/763 |
| 3,400,096 | 9/1968 | Bateman et al. | 260/763 |
| 3,404,120 | 10/1968 | Gotshall | 260/763 |

FOREIGN PATENTS OR APPLICATIONS
474,685   8/1969   Switzerland............................ 85/82

*Primary Examiner*—Edward C. Allen
*Attorney, Agent, or Firm*—Michael S. Striker

[57] ABSTRACT

An expansion anchor includes an expansion anchor sleeve and expanding means for causing expansion thereof. The expansion anchor sleeve is composed of a plastically deformable carbon-based material.

8 Claims, 2 Drawing Figures

PATENTED DEC 17 1974　　3,854,373

EXPANSION ANCHOR

BACKGROUND OF THE INVENTION

The invention relates to tubular expansion anchors which are composed of synthetic material, and more particularly to an expansion anchor sleeve of a plastically deformable carbon-based material.

Such expansion anchors are used where it is desired to secure a load-carrying or fastening member in a support structure, such as masonry or brickwork. A bore is provided in the masonry, the expansion anchor sleeve is inserted into the bore and the expanding member, which is usually identical with the fastening member, is then inserted into the tubular expansion anchor. The diameter of the expanding member is chosen so as to be larger than the inner diameter of the expansion anchor sleeve. As a result, when the expanding member is inserted into the expansion anchor sleeve, the latter is forced to expand and its outer wall is forcibly urged into contact with the wall bounding the bore. Since the expanding member is firmly retained in the expansion anchor sleeve which latter, in turn, is now firmly enclosed in the bore, the expanding member is thereby secured in the masonry and can support a load.

Expansion anchors are already known wherein a portion of the hollow, cylindrical expansion anchor sleeve is provided with slots. The purpose of these slots is to facilitate expansion of the sleeve when an expanding member is inserted therein, whereby the outer surface of the sleeve is pressed against the wall of the bore provided in the masonry.

However, expansion anchors of the above type have the disadvantage that only a small portion of the outer surface of the sleeve is pressed against the wall bounding the bore. Thus, large tensile forces cannot be transmitted and the resistance of the expansion anchor to being pulled out of the bore is low.

Also known are anchors wherein the outer surface of the sleeve is threaded for the purpose of increasing the frictional contact between the sleeve and the wall bounding the bore. Such anchors, which must be screwed into the bore, are, however, very expensive to produce and can only be inserted into the bore by using special tools.

SUMMARY OF THE INVENTION

Accordingly, it is an object of the invention to overcome the above disadvantages.

Another object of the invention is to provide an expansion anchor which is of universal utility.

A further object of the invention is to provide an expansion anchor which can be secured in a bore without the use of special tools or procedures.

An additional object of the invention is to provide an expansion anchor whose sleeve need not be specially profiled or provided with barbs, threads or the like in order to be secured in a bore.

It is also an object of the invention to provide an expansion anchor which can be securely anchored in such materials as concrete, brick or tile and which can transmit large tensile forces even when anchored in such materials.

A concomitant object of the invention is to provide an expansion anchor which has the property that the inner surface of the expansion anchor sleeve conforms to the profile of the expanding means or load-carrying member which is inserted therein and retains this shape even after removal of the expanding means or load-carrying member from the sleeve.

It is, furthermore, an object of the invention to provide an expansion anchor which has the property that the outer surface of the expansion anchor sleeve conforms to discontinuities in the bore wall so as to provide firm and secure anchoring of the expansion anchor.

In accordance with these and other objects, the invention provides a novel expansion anchor which comprises an expansion sleeve composed of a plastically deformable carbon-based material, and expanding means for causing expansion of the expansion anchor sleeve.

Such an expansion anchor can be produced by having the material of the expansion anchor sleeve include substantially 65–75 percent by weight of particulate, i.e., pulverized or powdered, hard and/or soft coal. Approximately 90–98 percent of the coal comprises particles having a particle size of less than about 100 microns whereas the remainder of the coal (approximately 2–10 percent) comprises particles having a particle size of about 100–300 microns. The material of the expansion anchor sleeve may further include substantially 25–35 percent by weight of natural and/or synthetic rubber.

According to a further embodiment of the invention, approximately 5–10 percent by weight of the rubber may be replaced by polyvinylchloride and/or polyethylene. It is also advantageous if substantially 1–5 percent by weight of the rubber is replaced by a softener or plasticizer. Such plasticizers are well known in the art and include, for example, the phthalate plasticizers. Suitable plasticizers are "Plastikator" manufactured by the Bayer Co, of Germany and "Palatinol AH" manufactured by the BASF Co. of Germany. A particularly favorable plasticizer for use in the expansion anchor sleeve is phthalic acid di-butylester. When the material of the expansion anchor sleeve includes polyvinylchloride and/or polyethylene as well as a plasticizer, the rubber content of the material may be relatively low, i.e., of the order of 10 percent by weight.

The prerequisites for simply manufacturing an ordinary anchor sleeve are, surprisingly, extremely well fulfilled by utilizing a material in accordance with the invention. The mixture can be extruded into tubular sections of arbitrary lengths in known manner and then need only be cut into whatever lengths are required or desired.

The anchor sleeve produced according to the invention is simple to manipulate and may even be used as an anchor sleeve in bore holes whose diameters depart somewhat from the theoretically correct diameter. Even under such conditions, the anchor sleeve can be firmly and surely secured in the bore hole. The anchor sleeve itself may be of a simple tubular form having substantially smooth outer and inner surfaces as well as a central passage, i.e., bore, of substantially constant diameter. The wall thickness of the anchor sleeve may be the order of 1–4 millimeters and the length of the anchor sleeve is determined by the length of the expanding member or means.

The novel features which are considered as characteristic for the invention are set forth in particular in the appended claims. The invention itself, however, both as to its construction and its method of operation together with additional objects and advantages, will be best understood from the following description of spe-

DESCRIPTION OF THE PREFERRED EMBODIMENTS

Figure 1:
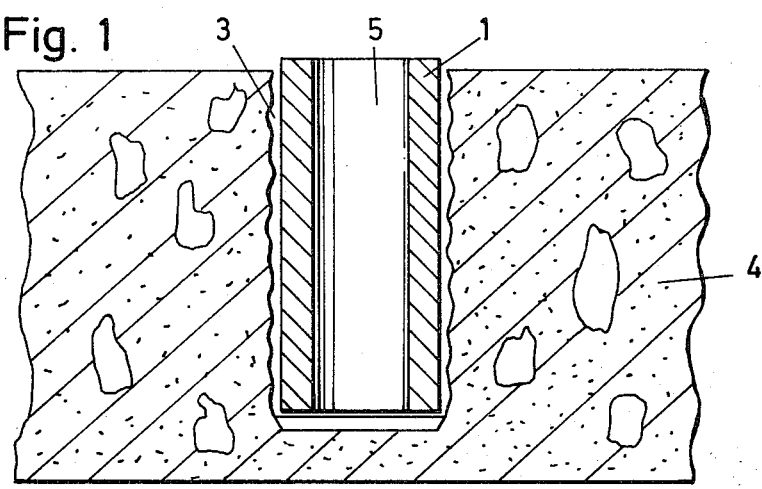
FIG. 1 is a schematic cross-section illustrating a bore hole provided in masonry or brickwork and an expansion anchor sleeve inserted in the bore hole.

Referring to FIG. 1, it is seen that the masonry or brickwork 4 is provided with a bore hole having grooves or ridges 3 in the wall thereof. The expansion anchor sleeve 1, which is composed of plastically deformable carbon-based material, includes a bore or passage 5 and fits rather loosely in the bore hole provided in masonry 4. Wall means surround passage 5 of expansion anchor sleeve 1 and the wall means preferably have a wall thickness of 1–4 millimeters although these dimensions are not critical. Expansion anchor sleeve 1 may be of any desired configuration. Preferably, expansion sleeve 1 is tubular.

Figure 2:
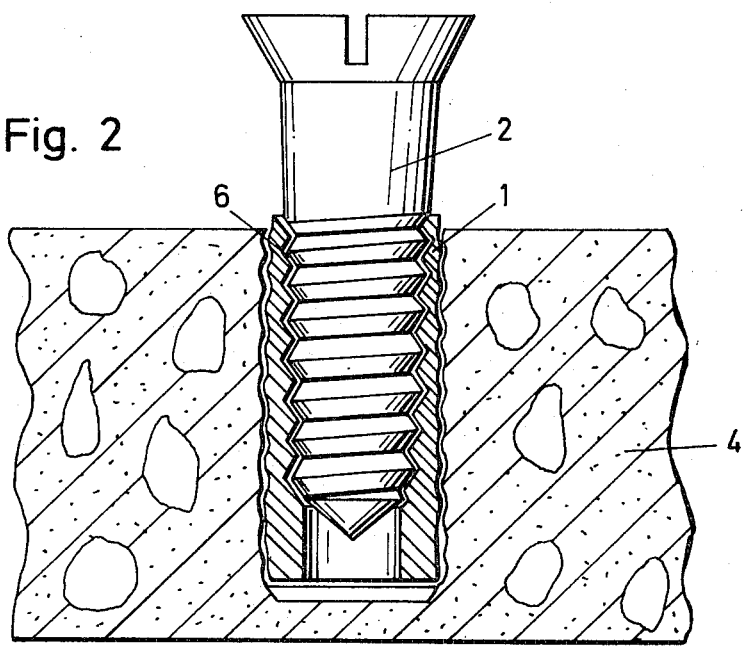
FIG. 2 shows the expansion anchor sleeve of FIG. 1 after a fastening screw has been screwed therein.

FIG. 2 shows expansion anchor sleeve 1 after expanding means or member 2 has been inserted in passage 5 so as to form, in toto, an expansion anchor. Expanding means 2 is here shown as being in the form of a screw but it is to be understood that expanding means 2 may be of any suitable configuration. It is seen that the outer diameter or dimension of expanding means 2 is greater than the diameter or dimension of passage 5. Insertion of expanding means 2 into passage 5 produces a radial pressure and, since expansion anchor sleeve 1 comprises plastically deformable material, the entire cross-section of the bore hole is filled in, i.e., the cross-section of the bore hole is filled with the material of expansion anchor sleeve 1 and expanding means 2. Furthermore, the radial pressure produced by insertion of expanding means 2 into passage 5 also forces the material of expansion anchor sleeve 1 into grooves 3 of masonry 4. Simultaneously, the wall of passage 5, i.e., the inner surface of expansion anchor sleeve 1, is deformed by the threads of expanding means 2. As a result, a clean-cut, integral thread 6 is formed on the inner surface of expansion anchor sleeve 1. Thread 6 remains, substantially unchanged, even after removal of expanding means 2 from passage 5. In general, it may be seen that both the inner and outer surfaces of expansion anchor sleeve 1 are capable of conforming to the configuration of any arbitrarily shaped surface with which they come into intimate contact and that, further, these surfaces are capable of retaining configurations which have been imparted to them.

An expansion anchor sleeve 1 made in accordance with the invention and having an outer diameter of 6 millimeters can, for example, be firmly and securely anchored even in a bore hole having a diameter of 7 millimeters. With such variations in dimensions, a sufficiently large frictional engagement between the wall of the bore hole and the expansion anchor sleeve 1 is still attained during insertion of expanding means 2 into passage 5 so as to allow high tensile forces to be transmitted by the expansion anchor.

Expanding means 2 having an arbitrary type of thread or configuration can be inserted into passage 5 of expansion anchor sleeve 1. For example, if an expansion anchor sleeve 1 having an outer diameter or dimension of 6 millimeters is placed in a bore hole provided in concrete, which bore hole has a diameter or width of 6.5 millimeters and a depth of 30 millimeters, and expanding means 2 of 5 millimeters diameter or width and of 40 millimeters length is inserted in expansion anchor sleeve 1, it is then possible for the expanded anchor to sustain a tensile load of 800 kilograms. Similar expansion anchors of the type known from the art, when anchored in concrete under the same circumstances, can only sustain a load of 500 kilograms.

A working example illustrating the manner in which an expansion anchor sleeve in accordance with the invention may be made, is as follows:

EXAMPLE 1

65 percent by weight of pulverized or particulate hard coal, comprising 95 percent of particles having a particle size of less than 100 microns and 5 percent of particles having a particle size of less than 200 microns, is intimately mixed with 20 percent by weight of rubber powder, 10 percent by weight of polyvinylchloride powder and 5 percent by weight of phthalic acid dibutylester (fluid). This mixture is heated at about 150°C while being kneaded and, after heating, is granulated. Subsequently, the granulated mixture is extruded, in an extruder heated to about 130°C, into a tubular form having an outer diameter of 8 millimeters and an inner diameter of 4 millimeters. After cooling, the thus obtained tube is cut into lengths of about 5 centimeters each for use.

Other examples of compositions for expansion sleeves according to the invention are outlined below. The detailed procedure by which these compositions may be formed into expansion anchor sleeves is substantially as presented in Example 1.

EXAMPLE 2

75 percent by weight of pulverized or particulate soft coal (comprising 98 percent of particles having a particle size of less than 100 microns and 2 percent of particles having a particle size of less than 250 microns), 15 percent by weight of natural rubber 7 percent by weight of polyvinylchloride 3 percent by weight of plasticizer ("Plastikator," manufactured by Bayer Co. of Germany).

EXAMPLE 3

70 percent by weight of a 50–50 mixture of hard and soft coal (comprising 92 percent of particles having a particle size of less than 100 microns and 8 percent of particles having a particle size of less than 200 microns)

20 percent by weight of natural rubber 7 percent by weight of polyethylene 3 percent by weight of plasticizer ("Palatinol AH", manufactured by the BASF Co. of Germany).

It is self-evident that an expansion anchor and expansion anchor sleeve in accordance with the invention can be used in all types of construction material such as, for example, brick, tile, light concrete, sandwiched plates, laminates, gypsum, plaster, wood and the like. However, the load-carrying ability of the expansion anchor and expansion anchor sleeve will naturally be limited by the mechanical properties of the construction material in which they are used.

It will be understood that each of the elements described above, or two or more together, may also find a useful application in other types of constructions and applications differing from the types described above.

While the invention has been illustrated and described as embodied in an expansion anchor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What is claimed as new and desired to be protected by Letters Patent is set forth in the appended claims.

1. An expansion anchor, comprising a tubular expansion anchor sleeve having substantially smooth outer and inner surfaces and a bore of substantially constant diameter, said sleeve being composed of a plastically deformable carbon-based material, including substantially 65-75 percent by weight of particulate matter selected from the group consisting of hard and soft coal, 15-30 percent by weight of a first substance selected from the group consisting of natural and synthetic rubber, and substantially 5-10 percent by weight of a second substance selected from the group consisting of polyvinylchloride and polyethylene; and an expansion member having at least partly a diameter greater than said diameter of said bore of said expansion anchor sleeve and insertable into said bore for causing expansion of said expansion anchor sleeve.

2. An expansion anchor as defined in claim 1, wherein said expansion anchor sleeve comprises wall means having a wall thickness of substantially 1-4 millimeters.

3. An expansion anchor as defined in claim 1, wherein substantially 90-98 percent of said coal comprises particles having a particle size less than substantially 100 microns and substantially 2-10 percent of said coal comprises particles having a particle size of substantially 100-300 microns.

4. An expansion anchor as defined in claim 1, wherein said material further comprises substantially 25-30 percent by weight of said first substance.

5. An expansion anchor as defined in claim 1, wherein said material comprises substantially 20-30% by weight of said first substance selected from the group consisting of natural and synthetic rubber and substantially 1-5 percent by weight of a plasticizer.

6. an expansion anchor as defined in claim 5, wherein said plasticizer comprises phthalic acid di-butylester.

7. An expansion anchor as defined in claim 1, wherein said material comprises substantially 15-29 percent by weight of said first substance selected from the group consisting of natural and synthetic rubber, and substantially 1-5 percent by weight of a plasticizer.

8. An expansion anchor as defined in claim 7, wherein said plasticizer comprises phthalic acid di-butylester.

* * * * *